United States Patent [19]

Simopoulos et al.

[11] Patent Number: 4,853,079

[45] Date of Patent: Aug. 1, 1989

[54] METHOD FOR MAKING ELECTROLUMINESCENT PANELS

[75] Inventors: Nicholas T. Simopoulos; George N. Simopoulos; Gregory N. Simopoulos, all of Dayton, Ohio

[73] Assignee: Lumel, Inc., Dayton, Ohio

[21] Appl. No.: 192,260

[22] Filed: May 10, 1988

Related U.S. Application Data

[60] Division of Ser. No. 840,630, Mar. 17, 1986, Pat. No. 4,767,966, which is a continuation-in-part of Ser. No. 801,511, Nov. 25, 1985, Pat. No. 4,647,337, which is a continuation of Ser. No. 677,645, Dec. 4, 1984, abandoned.

[51] Int. Cl.[4] .......................... B44C 1/22; C03C 15/00; B05D 3/06; C23F 1/02

[52] U.S. Cl. .................................... 156/633; 156/656; 156/659.1; 156/667; 156/902; 156/67; 427/64; 427/66; 427/71

[58] Field of Search ............ 156/633, 645, 656, 659.1, 156/667, 902, 67; 428/338, 421, 690, 9.7, 901; 427/64, 66, 71; 313/502, 503, 506, 509

[56] References Cited

U.S. PATENT DOCUMENTS

| | | | |
|---|---|---|---|
| 2,858,632 | 11/1958 | Caserio et al. | 40/544 |
| 2,922,993 | 1/1960 | Sack, Jr. | 40/544 X |
| 3,037,138 | 5/1962 | Motson | 313/509 X |
| 3,133,221 | 5/1964 | Knochel et al. | 313/193 |
| 3,172,773 | 3/1965 | Blazek | 117/33.5 |
| 3,201,633 | 8/1965 | Lieb | 313/510 X |
| 3,205,393 | 9/1965 | Mash | 313/50 |
| 3,238,407 | 3/1966 | Jaffe | 313/108 |
| 3,254,254 | 5/1966 | Buck, Jr. | 313/108 |
| 3,312,851 | 4/1967 | Flowers et al. | 313/108 |
| 3,325,664 | 6/1967 | Buck, Jr. | 313/108 |
| 3,341,916 | 9/1967 | Greene | 313/509 X |
| 3,475,640 | 10/1969 | Litant et al. | 313/108 |
| 3,729,342 | 4/1983 | Velde | 117/217 |
| 4,143,297 | 3/1979 | Fischer | 313/509 X |
| 4,297,681 | 10/1981 | Dircksen | 340/366 E |
| 4,501,971 | 2/1985 | Ochiai | 250/483.1 |
| 4,508,636 | 4/1985 | Ochiai | 252/301.36 |
| 4,508,760 | 4/1985 | Olson et al. | 427/213.34 |
| 4,513,023 | 4/1985 | Wary | 427/54.1 |
| 4,560,902 | 12/1985 | Kardon | 313/502 |
| 4,614,668 | 9/1986 | Topp et al. | 313/509 X |
| 4,645,970 | 2/1987 | Murphy | 40/544 X |

FOREIGN PATENT DOCUMENTS

| | | | |
|---|---|---|---|
| 0172985 | 5/1986 | European Pat. Off. . |
| PCT/US85/-00183 | 2/1985 | PCT Int'l Appl. . |

OTHER PUBLICATIONS

FIGS. 1–4, Photocopies of Shift Selector Console of 1986, General Motors Corporation Buick Riveria.

*Primary Examiner*—William A. Powell
*Attorney, Agent, or Firm*—Biebel, French & Nauman

[57] ABSTRACT

An electroluminescent panel and method of making the same includes a plurality of layers on a transparent electrode in which each layer is formed with the same compatible polymer carrier resin base material so that the individual layers have an integrated uniformity. A polyester laminating resin is disclosed for the resin base material of each layer which is activated by a small amount of diisocyanate sufficient to provide temperature stability, but insufficient to transform the base material into a urethane.

Also disclosed is an electroluminescent lamp which emits light only in discrete areas such as to produce a pattern of light in which the phosphor is applied in a pattern corresponding to the discrete areas which are to be illuminated. Similarly, the electrodes are restricted to the illuminated regions or areas, thereby conserving material as well as reducing the power requirements of the lamp.

Also disclosed is an electroluminescent lamp in which the power leads are applied to the lamp at locations inwardly of the margin of the lamp, and a method of attaching the power leads inwardly of the lamp margins.

9 Claims, 2 Drawing Sheets

METHOD FOR MAKING ELECTROLUMINESCENT PANELS

RELATED APPLICATION

This application is a division of Ser. No. 840,630 filed Mar. 17, 1986, now U.S. Pat. No. 4,767,966, which is a continuation-in-part of Ser. No. 801,511 filed Nov. 25, 1985, now U.S. Pat. No. 4,647,337 issued Mar. 3, 1987, which is a continuation of Ser. No. 677,645 filed Dec. 4, 1984, abandoned.

BACKGROUND OF THE INVENTION

This invention relates to electroluminescent panels, and more particularly to flexible electroluminescent panels and methods of making the same.

In spite of progress in the manufacture of electroluminescent lamps and panels, there remains a need to improve the integrity of such panels, to increase the brightness of the panels over the service life, to increase the service life, to provide versatility in the displays, and to lower the manufacturing costs.

The effective brightness of a panel at a given voltage drive potential and frequency, and the ability of the panel to maintain such brightness over a long life, is of paramount concern. For example, it has been estimated that in 100,000 miles, an automotive instrument cluster will log about 2,200 hours. An electroluminescent panel in association with such an instrument cluster must provide a service life in excess of 2,000 hours and preferably substantially beyond. A further requirement is that the light output begin at an initially high level, and remain substantially constant both as to output and color balance throughout the panel's useful life, which may be defined as the length of time required for the luminance to decay to a value of 50% of original output.

The relatively high cost of manufacturing electroluminescent panels may, in part, be attributed to difficulties in manufacturing, and the inefficient use of relatively high cost materials, such as semi-precious metals and phosphor. For example, in many configurations, where less than the full surface of the panel is to be used, it has been a practice to mask the unused portion, which practice is wasteful both of materials and of power required to drive the panel. Panels are often designed in such a manner that they consume a disproportionate amount of power for the surface area utilized, thereby necessitating the use of a power supply which is in excess of the actual net requirements.

Since an electroluminescent lamp is made up of a plurality of operable materials for specific purposes, often such materials which are obtained from variable sources or have differing basic configurations. Thus the base materials, coatings, phosphors, resins, pigments, electrodes, and the like, are frequently combined without reference or thought to full compatibilty of materials from one layer to the next. Lack of compatibility can result in mechanical as well as chemical anomalies, and may manifest itself in surface wrinkling, or bending of thin panels, or may result in the physical separation of layers, or the lack of good moisture barrier qualities at the interfaces and edges. The resultant difficulties can result in a physically poor product as well as a product which has a high susceptibility to moisture damage or other environmental factors leading to a shortened life. Further, such incompatibility may limit the extent to which the panel may be electrically driven, may reduce the effective light output from the phosphors, or otherwise decrease the brightness of the panel.

U.S. Pat. No. 3,312,851 issued Apr. 4, 1967 to Flowers et al describes the desirability of maintaining the dielectric layer as thin as practical to provide a steep electric gradient thereacross, and further describes the difficulty of superimposing one or more clear coats of the same resin as was used for the phosphor layer, over the phosphor layer, where cyanoethylated polyvinyl alcohol is used as the embedding resin for the phosphor, and where the clear coating applied from a solution of the same resin tended to redissolve the phosphor coating, resulting in the penetration of the phosphor layer with an accompanying disturbance of phosphor distribution, and light impairment.

Flowers et al addressed this problem by adding an organic compound which included (among others) 2, 4.toluene diisocyanate to the previous resin to form a phosphor embedding material. In one example, additional films of clear resin (i.e., cyanoethylated polyvinyl alcohol and polyisothiocyanate or polyisocyanate) were cast on top of the phosphor layer. However, Flowers et al appear to have used the same resin only in the phosphor layer and dielectric layer, did not appreciate or directly address the compatibility or lack of compatibility of the adjacent polymer resins, and did not use subsequent resin layers to form an opaque pigment or to form a back electrode, and they did not use a polyester laminating resin.

A further difficulty resides in the conventional placement of the electric power leads at the margins or edges of the panel. Such lead placement makes more expensive or complicated the use of electroluminescent panels in installations where it would be advantageous to bring the power leads into the panel at a location remote from the edges. Internal lead placement has usually involved only the power lead to the back electrode, and there exists a need to make internal power lead connections to the transparent electrode.

Decorated or decorative electroluminescent panels have been made in which only portions of the entire panel areas are energized, to form a pattern of lighted areas on the panel. Commonly, such selective lighting or decoration has been achieved by suitably configuring a back metal electrode into the pattern desired, with individual power leads attached to the metal electrode segments as required. Such arrangements are shown in U.S. Pat. No. 3,133,221 issued May 12, 1964 to Konosho et al and U.S. Pat. No. 3,225,644 issued June 13, 1967 to Buck, Jr. et al. In the configurations shown in these patents, no attempt has been made to restrict either the areas of application of the phosphor or the areas, size or limits of the transparent electrode to conform to the pattern. Therefore, a substantial area of phosphor remains unused, and the unused area of the transparent electrode increases the likelihood of short circuits or accidental groundings. Commonly, such configured panel arrangements employ a solid metal back electrode which could be cut or stamped to the desired configuration.

SUMMARY OF THE INVENTION

The present invention is directed to the construction of electroluminescent panels and methods of making the same, which overcome many of the shortcomings of presently available panels. In one aspect of the invention, each of the operative layers of a flexible electroluminescent panel is formed with a resin carrier which is compatible with that of each of the other layers in that the resin carrier of each layer has basically the same physical, chemical and electrical properties as those of the other layers. In the preferred embodiment, each of the operative layers applied to a base material is a polyester casting resin. As a result of using the same resin carrier in each polymer layer, the completed electroluminescent panel is homogeneous throughout all such layers with no discernible difference in the crystalline structure making up each of the layers apart from the presence of a filler material, such as phosphor, pigment, dielectrics, or metal. Preferably, a resin is formulated employing a casting polyester of the kind described in parent application Ser. No. 677,645, which polyester casting resin may be activated by a relatively small quantity of diisocyanate such as toluene diisocyanate. Such resin has been found to have excellent adhesion to the polyester base sheet such as "Mylar," to which a metallized transparent electrode, such as a indium-oxide, has been applied. Such resin material has further been found to have a high dielectric constant, providing excellent lamp brilliance, coupled with excellent moisture protection and long service life. The quantity of toluene diisocyanate used is insufficient to form a urethane, but is advantageous in enhancing the temperature stability of the panel, and in making a resin layer which is somewhat more durable for handling purpose after curing. However, good results have been obtained where the diisocyanate has been omitted.

In a further aspect of the invention, the electroluminescent lamp is designed to emit light only in discrete areas, for the purpose of producing a pattern of light as desired, which pattern occupies less than the full surface area of the panel. To this end, it has been found advantageous to remove certain areas of the transparent electrode, such as by acid etching, so as to form a remaining area in which portions of the electrode correspond to portions of discrete areas of the lamp to be illuminated, joined by electrically connecting segments so that the individual portions may operate as a single electrode from a single electric lead from the power supply. Thereafter, a phosphor carrying polymer resin is applied in a pattern corresponding to such discrete areas of the design to be illuminated as a part of the lamp, in superimposed relation to corresponding portions of the transparent electrode.

In the manufacture of a single-sided panel according to this invention, a dielectric layer is then applied over the phosphor layer. The dielectric layer may be applied discretely as in the case of the phosphor layer or, for the purpose of encapsulating and sealing the phosphor, as well as for expedient production, it may be applied over the entire exposed surface of the panel. The dielectric layer preferably is a carrier for a pigment, such as barium titanate, to provide a white reflective backing surface, for redirecting light from the phosphor through the transparent front electrode and the transparent polyester base. The barium titanate also increases the overall dielectric constant of the lamp.

A second, non-transparent, electrode is then applied over the dielectric layer again using a compatible polymer resin carrier, such as the preferred polyester casting resin, which layer may contain metal in the form of flaked silver, nickel or the like, to form a back electrode. In this manner, only the portions of the lamp to be illuminated, in accordance with the desired pattern of illumination are activated, thereby effecting substantial savings in the amount of materials applied for a given design of lamp, and at the same time, effecting a savings in the power which would otherwise be required to drive the lamp.

Preferably, each operative resin layer is dried or cured before the next layer is applied, followed by the curing of the conforming or sealing layer, to form a completed or finished panel. Preferably, the individual resin layers are applied by screen printing, particularly those layers which are applied to less than the full surface of the panel, such as where a discrete pattern is applied. Screen printing provides an effective technique for obtaining accurate registrations of the patterns of each of the layers.

The panel of this invention is characterized by the fact that the applicable coatings are limited to discrete areas of the panel, in accordance with a predetermined pattern or design. This permits costly phosphors, conductive silvers, or other ingredients to be confined or limited to discrete areas of the panel, corresponding to the desired pattern or design. In the case of the electrodes, additional connecting segments, as required, are formed to assure continuity or integrity of the respective electrodes and associated lead connections. The connecting electrode segments may be offset from each other to reduce coupling at these areas where no light output is desired.

A further aspect of the invention relates to the attachment of power leads to the panel electrodes. Commonly, one or more of the power leads are attached to bus bars. However, in panels formed with complex lighting patterns, it is frequently difficult or inconvenient to apply a bus bar which is electrically connected to the transparent electrode, and it is desirable to make a lead attachment directly to the electrode at a location inward of the panel margin. This is accomplished in the present invention by selecting an area of the transparent electrode for subsequent lead attachment. This area may be on a connecting segment or portion on the electrode outside of the lighted areas or regions. This selected area is thereafter protected from subsequent coatings as by blocking the area on the printing screen or masking the area. After the back electrode has been applied, and optionally after a conformal coating has been applied and the panel trimmed, the power lead is applied to the preselected area by pressing a portion thereof against the exposed electrode area and applying a conductive adhesive, which may be the same material as used for the back electrode. Preferably localized heat is applied to bond the lead. The use of the same compatible resin assures good attachment without lifting, as the same resin forms a structural adhesive and an electrical connection. A second power lead may be attached to the back electrode using the same application technique, either at a marginal location or at a convenient location inwardly of the panel margins.

It is accordingly an important object of this invention to provide an electroluminescent panel in which each of the resin layers are made using mutually compatible resins, and preferably using the same resin formulation for each layer, so that the completed panel is homogeneous throughout such layers.

A further object of the invention is the provision of an electroluminescent panel adapted to provide light in a discrete or distinctive pattern of light, and having an electrode and phosphor layers configured on the panel in accordance with such pattern.

A further object of the invention is the provision of a single-sided electroluminescent panel and a method of making the same, including a sheet of polyester base material carrying a transparent electrode, and a plurality of layers applied thereto, in which each of such layers employs a carrier resin consisting of a polyester adhesive resin which may be activated by a small quantity of diisocyanate to improve temperature stability and handling of the panel.

Another object of the invention is the provision of a panel, as outlined above, in which efficient use is made of the components making up the various layers, so that the phosphors are applied and activated only at discrete portions or areas of a panel making up a pattern or design, thereby optimizing the use of the phosphors and electrode materials, and reducing the power required from a power supply to drive the panel.

A further object of the invention is to provide an electroluminescent panel and a method of making the same, in which the brightness (luminance) and the color balance (chromaticity) remain relatively constant over a long period of usage.

A further object of the invention is the provision of a method of attaching power leads to the electrodes on such a panel at discrete locations inward leg of the panel margins, and of an improved panel having one or more of the power leads attached directly to an electrode surface.

These and other objects and advantages of the invention will be apparent from the following description, the accompanying drawings and the appended claims.

BRIEF DESCRIPTION OF THE DRAWINGS

FIGS. 1-6 illustrate the steps in the manufacture of a panel according to this invention in which:

FIG. 1 shows a transparent electrode coated base film and an acid-resist coating baked on the surface to define a discrete pattern;

FIG. 2 illustrates the panel of FIG. 1 following etching and removal of the resist coating;

FIG. 3 illustrates the panel after the application of phosphor at discrete locations of the panel;

FIG. 4 illustrates the panel of FIG. 3 following the application of a pigmented dielectric layer;

FIG. 5 illustrates the panel of FIG. 4 following the application of the second or rear conductive electrode and after the application of leads;

FIG. 6 shows the completed panel of FIG. 5 looking at the front side thereof following the application of a conforming coating, trimming and following the application of decorative graphics on the front surface.

DETAILED DESCRIPTION OF PREFERRED EMBODIMENTS

The preferred embodiments of the panel and methods of making the same are described in the context of a single-sided electroluminescent panel formed on a base of polyester material, although it is understood that the teachings herein may be applied to double-sided panels as well.

Figure 1:
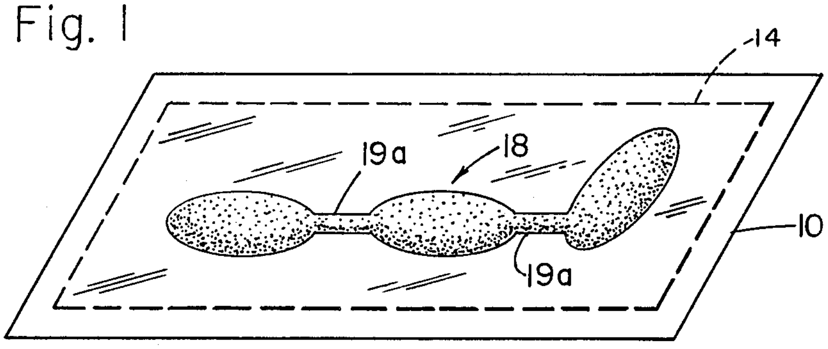
Figure 7:
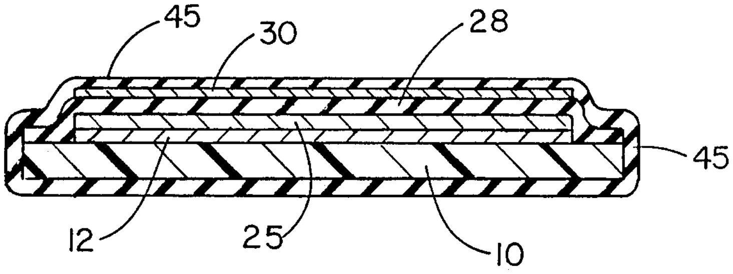
FIG. 7 is a transverse section through the panel taken generally along the line 7—7 of FIG. 6.

Referring to FIG. 1, a base 10 comprises a sheet of temperature stabilized polyester film, such as "Mylar", which may for example be 5 mils thick, to which has been vacuum deposited on the surface an indium-oxide layer 12 (FIG. 7) to form a transparent electrode. It may be understood that other transparent electrode materials may be used, such an indium-tin-oxide or gold. The electrode 12 has a resistance in the order of 100-200 ohms per square. The layer 12 forming the electrode is shown in FIG. 7 in exaggerated thickness, and is only a few Angstroms thick. The sheet of polyester film is cut to size, such as by using a steel rule die, to form the base 10 which may be slightly larger than the finished size of the completed panel, as illustrated by the margin 14 in FIG. 1.

It will be understood that the completed panel will have lighted regions or areas which may be considered as forming a discrete design or pattern, in this case, two longitudinally extending oval areas and one transverse oval area, for the purpose of illustration only. Reference numeral 18 designates the lighted pattern generally, although it is understood that the lighted areas may take any desired configuration, or may, where desired, occupy the entire operative surface of the panel. However, one of the important advantages of the present invention resides in the arrangement and method by which costly ingredients are limited essentially to the operative areas of the panel making up the design or pattern 18. A secondary advantage resides in the fact that the power source required to drive such a panel may be tailored to energize only such portions of the completed panel as are required in accordance with the design or pattern 18.

After the base 10 has been cut, the exposed surface of the transparent electrode layer 12 is cleaned, such as with isopropyl alcohol, and is then coated with an acid resist coating, as shown in FIG. 1, to define the desired configuration of the transparent electrode following removal of the remaining portion of the electrode by acid etching. It will be seen that the electrode area corresponds generally to the design 18, but with intermediate connecting segments 19*a* in order to provide for integrity or electrical continuity between individual portions which will become the lighted area of the design. It is preferred to apply the acid resist by screen printing.

Figure 2:
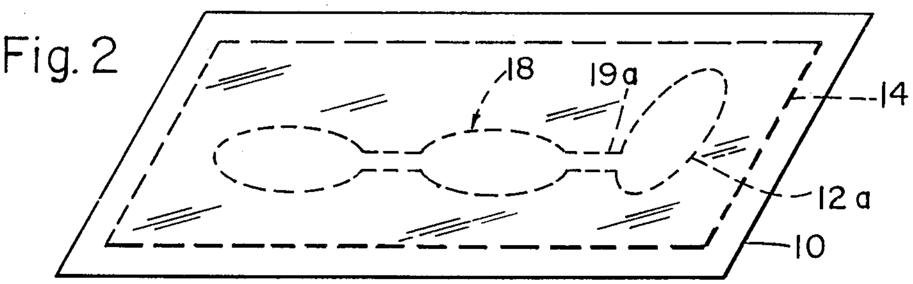

The acid resist coating may now be cured such as by heating to a temperature of 95° C. for a minimum of five minutes. Thereafter, the remaining portion of the transparent electrode 12 may be removed by acid etching in diluted hydrochloric acid and rinsed to neutralize any remaining acid. If desired, an alkali acid neutralizing solution may be used. Next, the acid resist coating 19 may be removed by a conventional paint remover or solvent for the resist and neutralized as necessary. The panel now has the appearance as illustrated in FIG. 2 in which the base 10 has remaining on its surface the electrode 12*a* now configured as shown by the broken lines, the remaining portion of the transparent electrode having been removed.

At this time, the front electrode 12 may be screen printed to form a bus bar, if desired, or to form electrical terminal contacts if conventional contacts are to be used. If such printing is accomplished, the carrier resin material should be adequately cured and dried in an inert atmosphere, as described below. Also, the resin carrier used for this step should be identical to the resin carrier described below, in connection with the application of subsequent layers.

Figure 3:
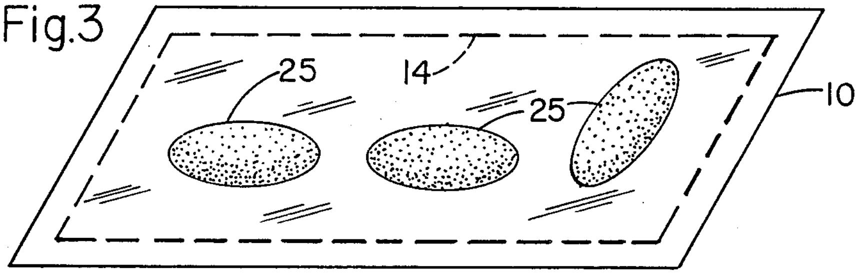
Figure 4:
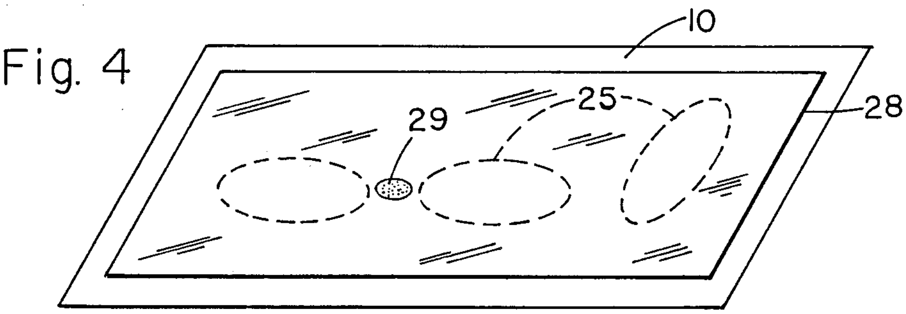

The phosphor layer 25 is now applied. As shown in FIG. 3, the phosphor layer is formed in discrete portions which correspond essentially to the desired design or light pattern 18, and is therefore preferably applied by screen printing.

The phosphor layer 25 employs a polymer resin carrier, which carrier is preferably a polyester laminating resin, such as Morton Adcote 503A made by Morton Chemicals Company, 2 North Riverside Plaza, Chicago, Ill. 60606, or the No. 49001 Polyester Resin, a laminating polyester resin of E. I. du Pont de Nemours and Company, Fabrics & Finishes Department, Wilmington, Del. 19898. Preferably, the identical laminating resin is used for each of the subsequent layers to assure the chemical and thermal compatibility of each layer, to the end that the layers combine to form a homogeneous continuous thickness of integrated uniformity and integrity.

In preparing the resin carrier, polyester adhesive resin is solubilized by adding cyclohexanone in equal parts by weight to the resin and the mixture is then milled until a homogeneous mixture is obtained. A wetting agent may be added to improve adhesion to the pigments and to the polyester substrate base 10. The wetting agent may consist of up to 1.0% by weight of Union Carbide Company's 1100 Silane, which is thoroughly mixed with the resin solvent. Additionally, a flowing and anti-foam agent may be added to improve silk-screening qualities. Eastman Kodak's "Ektasolve" DB acetate (diethylene glycol monobutyl ether acetate) is added at a ratio of 1:1 by weight to the above resin mixture as a flowing agent and anti-foamant. At this point, the resin carrier is prepared for use or storage.

It is preferred to add a small quantity of toluene diisocyanate, as an activator and curing agent, for the purpose of temperature stability to increase curing rate and to improve the handling characteristics. It is also believed that the diisocyanate may improve the dielectric qualities. Morton Chemical's Catalyst F, a toluene diisocyanate, may be used, 1.22% of total weight to 24.44% by weight of the prepared resin carrier previously described. It will be seen that this consists of approximately 5% by weight of the polyester adhesive resin, and this may be considered as a relatively small quantity of diisocyanate, which is insufficient to convert any substantial portion of the polyester into a polyurethane. In any event, it is preferred that no more than about 5.0 parts by weight of catalyst F be used to 100 parts by weight of polyester resin. If desired, du Pont's RC 803 isocyanate curing agent containing toluene diisocyanate in an ethylene acetate solvent may also be used in lieu of Morton Chemical's Catalyst F. This mixture is now completely mixed by a high shear mixture and then degassed for twenty minutes in a vacuum of at least 26" (880 millibars) of mercury. In the above-described basic polymer mix, which defines the preferred polymer carrier for each of the layers, cyclohexanone thinner is particularly advantageous for a silk-screening operation as it permits sufficient working time to coat the particles and prolong screen life.

The phosphor layer 25 is prepared by using resin carrier, described above, into which an appropriate phosphor has been blended. Typically, the phosphor has been washed and dried in an inert dry atmosphere, such as nitrogen, at 230° F. (110° C.) and blended with the prepared resin carrier in the ratio of about 70% phosphor by weight to 23% carrier by weight. Following mixing, the mixture is degassed in a vacuum, as previously described, and applied to the exposed surface of the transparent electrode 12 to define the discrete areas of the pattern, as shown in FIG. 3. The resin-laden phosphor layer 25 is now dried at 90° C. in an inert atmosphere, such as dry nitrogen, for 1 hour. Force drying, using an in-line dryer, can also be used to shorten the drying time.

A dielectric layer 28 is now applied over the phosphor layer 25. Preferably, the identical polymer casting resin is used as a carrier, made as described above. The dielectric layer may include a pigment, such as barium titanate, to form a pigmented dielectric layer, with particles of the pigment in the polyester carrier. The layer 28 may be applied over the back surface of the base sheet 10, or if desired, may be limited to the discrete areas defined by the transparent electrode 12 as shown in FIG. 2. However, where leads are to be attached at a location other than the panel edge, a lead access uncoated area 29 is chosen. This area is blocked out by a suitable portion of the screen, or protected by a mask, to provide access for connecting one of the power leads to the transparent electrode 12. In the preparation of the coating 28, polyester casting resin prepared as previously described is blended with dried barium titanate at a ratio of 1:1 by weight, and degassed as previously described. After application this layer is cured in the same manner as described for the phosphor layer 25.

Figure 5:
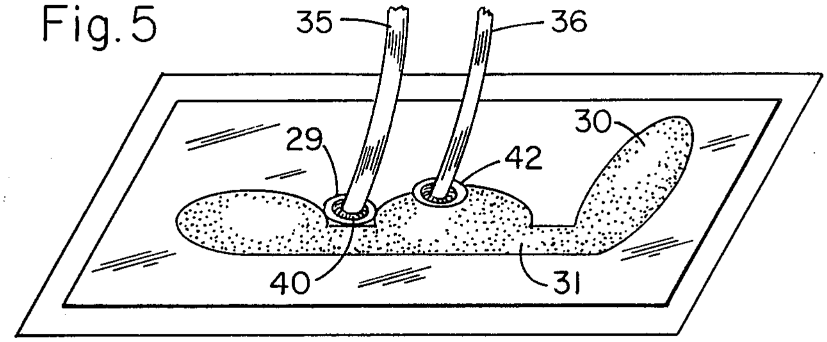

Following the application of the pigmented dielectric layer 28, the second or back electrode layer 30 is applied to the dielectric layer. This electrode layer is preferably screened on and is confined to the regions of the design represented by the phosphor layer, with a suitable interconnecting segment 31 as shown in FIG. 5. Preferably, the interconnecting segment 31 is laterally offset on the panel from the corresponding connecting segments **19*a* of the transparent electrode 12 to reduce coupling therebetween. The above-defined resin mixture is preferably used as the polymer carrier to which a metal conductor has been added to define the rear electrode. In a typical electrode mixture, flaked silver is thoroughly dried and mixed with the base resin in a ratio of 67% silver by weight to 33% resin base by weight, and the mixture degassed in a vacuum as previously described in connection with the resin mixtures for the preceding layers. After application, the second electrode layer 30** is cured in the manner previously described. The back electrode will have a low resistance of above five ohms per square.

Figure 6:
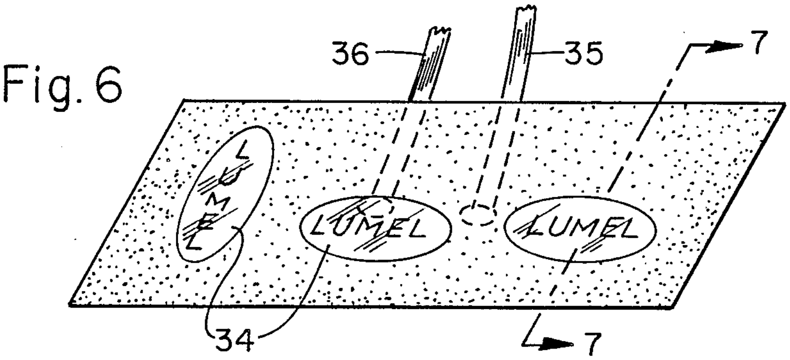

At this point, it should be determined whether or not the power leads are to be applied. If the panel is to require further handling, such as the application of graphics or legends on the front surface of the panel, as illustrated for example by the graphics 34 shown in FIG. 6, or if the panel is to be die cut or trimmed to size, it may be preferred to defer the attachment of the leads until such further handling is completed. However, if the leads are to be applied at this stage in the processing of the completed panel, they may now be directly attached to their respective electrodes. FIG. 5 illustrates the leads 35 and 36 after attachment. The lead 35 is connected to the transparent electrode within the protected and preselected area 29 formed on one of the interconnecting segments **19*a* of the transparent electrode 12. The end of a braided copper lead is preferably bent over and held against the electrode and a small amount of conductive epoxy adhesive 40 is applied on the end of the lead and on the electrode. Preferably, the same material which is used to form the electrode layer 30 is employed as the attaching conductive adhesive 40. This is heated locally, after application, to effect partial drying or curing, care being taken to avoid any shorting contact with the adjacent back electrode layer 30**. This connection area may, if desired, be coated with a dielectric clear coating of the same polyester casting resin and dried.

Lead 36 is similarly connected to the back electrode 30 at any convenient location by the application of a quantity of adhesive resin 42 which may again be the resin and conductive metal mixture used in the making of the electrode layer 30. Again, localized heating may be employed to cure and set the resin with the lead attached.

A conformal coating 45 for moisture barrier may be applied either prior to or after lead attachment. If applied prior to, it remains necessary to block by screen printing or by masking the preselected areas for lead attachment. The screen may be dipped in Kel-F 800, a polytetrafluoroethylene barrier resin of Minnesota Mining & Manufacturing Company, or may be screen-printed with this material as a barrier. Dow Corning Company's Saran HB film material may be used as a laminate barrier in lieu of the screen-printed or dipped barrier as previously noted.

The completed panel now comprises operative layers which are each essentially of the same chemical composition with respect to the polymer base resin or material. When a cross section of a panel made according to this invention is examined with a scanning electron beam microscope, it is seen that each coating blends continuously into the next to provide a homogeneous panel construction which is free of dissimilarities between layers and providing an integrated uniformity to the layers.

It should also be understood that a typical pattern applied to an electroluminescent lamp in accordance with the teachings of this invention may be considerably more complex than that illustrated in the drawings. Thus, there may be a variety of illuminated areas of different sizes and shapes, for the purpose of accomplishing a desired result. For example, in an automotive radio panel, only the portions of the panel which designate control functions, such as volume, on-off, balance, base, treble, and various touch button functions, may desirably be illuminated. Therefore, the relative areas of active phosphor may be comparatively small compared to the overall area of the polyester supporting base. Similarly, the interconnecting segments which join the front and back electrodes may themselves constitute a significant portion of the overall area, and as previously noted, these segments may be laterally offset from each other to reduce the capacitive coupling and thereby reduce the overall load which will be seen by the power supply to the panel. In addition, a panel constructed according to the teachings of this invention may be die cut, even in the areas of the electrodes with minimal risk of shorting between the electrodes. For example, a lighted portion of the flexible panel, defining, for example, a rectangular area, may be cut along three sides so that such portion may be folded back along an uncut fourth side and used to backlight an LCD display which may be inserted within such rectangular area.

While the methods and products herein described constitute preferred embodiments of this invention, it is to be understood that the invention is not limited to these precise methods and products, and that changes may be made in either without departing from the scope of the invention, which is defined in the appended claims.

What is claimed is:

1. The method of making a decorative electroluminescent lamp in which the lighted field of the lamp is formed into at least one discrete lighted portion at least partially surrounded by non-lighted portions of the lamp forming a decorative pattern of light thereon, comprising the steps of:

applying a transparent electrode to one side of a base sheet of polyester film;

printing said sheet on the electrode side thereof with an acid resist in a pattern corresponding to a desired configuration of the transparent electrode, said desired configuration corresponding to said decorative pattern plus electric connecting segments as necessary to join together portions of said electrode corresponding to said lighted panel portions;

etching said printed panel to remove said transparent electrode therefrom except where protected by said resist;

removing said resist to expose the remaining said transparent electrode;

applying a polymer resin containing an electroluminescent phosphor on said remaining transparent electrode corresponding to said discrete lighted portion to form a phosphor layer;

applying a dielectric polymer layer to said phosphor layer;

applying a second electrode polymer layer to said phosphor layer; and applying a sealing coating to said second electrode layer.

2. The method of claim 1 in which the base polymer of said resin, said dielectric polymer, and said second electrode polymer are identical.

3. The method of claim 2 in which said base polymer is a polyester laminating resin.

4. The method of claim 1 in which said resist, said phosphor layers, and said second electrode layer are applied by screen printing.

5. The method of claim 1 in which said phosphor layer is cured prior to the application of said dielectric polymer layer, and said dielectric polymer layer is cured prior to the application of said sealing coating.

6. The method of claim 1 in which said dielectric layer includes a pigment in the form of barium titanate.

7. The method of claim 1 in which said second electrode layer contains flaked silver.

8. The method of affixing a power lead directly to the transparent electrode of an electroluminescent lamp comprising the steps of:

determining a lead location on the electrode inwardly of the margins of the lamp, protecting the chosen lead area to prevent coatings from being applied to said chosen area, applying subsequent coatings to said lamp to complete the operative layers of said lamp, attaching a lead directly to said protected lead area by applying a conductive polyester resin and applying localized heat to set said resin.

9. The method of making an electroluminescent lamp with a power lead directly attached to a transparent front electrode at a location on the lamp inwardly of the lamp margin, in which a pattern of phosphor regions are energized by a pair of electrodes including said transparent front electrode and a back electrode, and in which said front electrode is formed with connecting segments which interconnect regions thereof corresponding to said phosphor regions, comprising the steps of:

selecting an area of said transparent electrode at one said connecting segment thereof for the subsequent attachment of a power lead, applying the phosphor coating to said transparent electrode in said pattern only, leaving said electrode segments free of phosphor, applying a dielectric coating to said lamp over said phosphor coating while protecting said selected lead area from coating, applying said second electrode as a coating to said lamp in said pattern while leaving said selected electrode area free of coating, and thereafter directly attaching said power electrode to said selected lead area with conductive adhesive.

* * * * *